May 12, 1936. T. J. SMULSKI 2,040,217
INDICATOR
Filed April 19, 1930
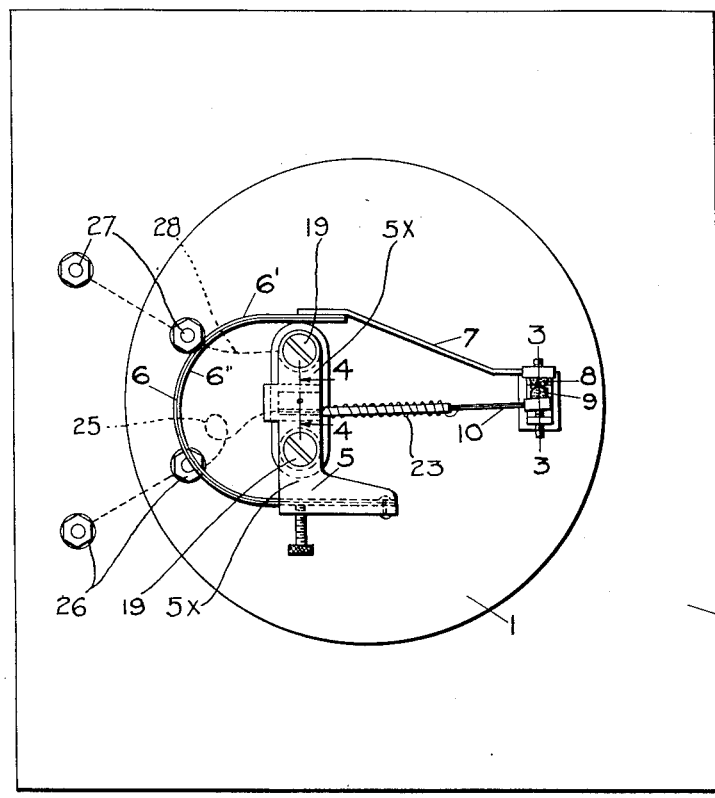
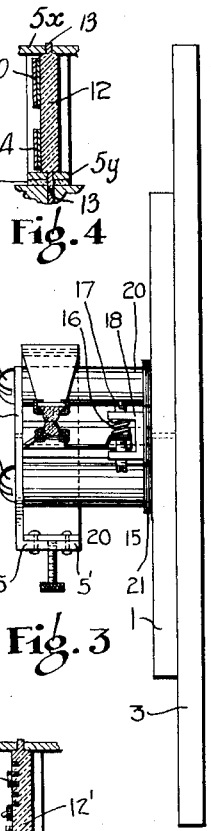
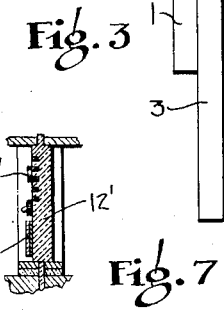
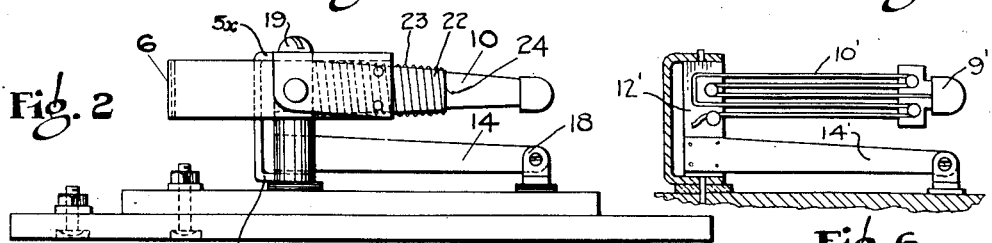
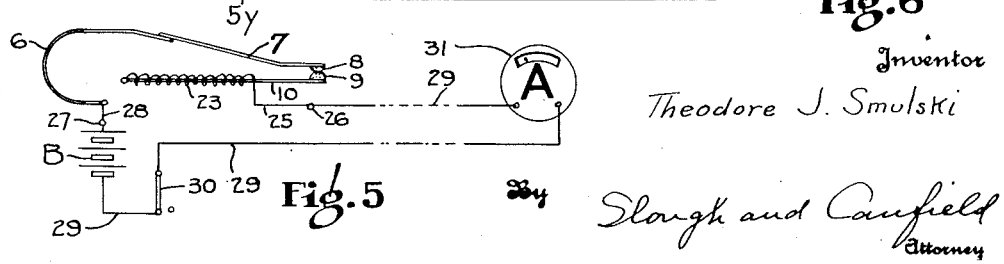
Inventor
Theodore J. Smulski
By Slough and Canfield
Attorney Patented May 12, 1936

2,040,217

UNITED STATES PATENT OFFICE 2,040,217

INDICATOR

Theodore J. Smulski, Gary, Ind., assignor to The Anderson Company, Gary, Ind., a corporation of Indiana Application April 19, 1930, Serial No. 445,647

4 Claims. (Cl. 177—351)

My invention relates to remote control apparatus, systems and methods, and relates more particularly to apparatus, systems and methods for effecting, at a given point, an act which is quantitatively commensurable with a controlling act effected at a relatively remote point.

My present invention is an improvement over certain disclosures of my prior copending application, Serial No. 156,054, filed December 20, 1926, and patented October 25, 1932 as United States Letters Patent No. 1,885,050 of which the present application is a continuation in part.

My invention relates broadly to indicating apparatus and particularly to apparatus adapted to accurately indicate an existing variable condition, during the prevalence of ambient conditions tending to render its operation inaccurate.

In my prior application an improved system was disclosed, whereby a pair of contacts, effecting a rapidly intermittent breaking and making of an electrical circuit, controlled a thermally operable indicator, disposed at a relatively remote point, to provide remote indications, commensurable with a force effecting the modification of the operation of the contacts.

In the present application, for the contacts of the aforesaid apparatus I substitute improved controlling means such as a carbon resistor means, which controls the simultaneous flow of electrical current, through a motivating element to modify the operation of said means, and a remotely disposed electro-responsive indicator. My improved apparatus is especially advantageous in that an indicator of the ammeter type may be employed therewith.

Indicating apparatus of the ammeter type is susceptible of being manufactured very cheaply, and when well damped will effect substantially continuous indications of the amount of current flowing therethrough under the control of such carbon resistor contactors, as disclosed herein, wherein at no time is the circuit controlled by said contactors, actually broken, as in the case were the set of contacts of my prior application employed.

My improved apparatus, system and method is adapted for use for remotely indicating the amount of a movement, or the value of a pressure, and to effect movement of a distant element commensurable to said controlling movement or pressure.

An object of the invention is to provide improved apparatus of the kind described which will give a precise physical indication of an existing condition, remotely thereof.

Another object of my invention is to provide an improved controller for such a system as is disclosed in my said copending application.

Another object of my invention is to provide an improved method for effecting the control of a distant mechanism commensurably with a force or movement at the controlling end of the system.

Another object of my invention is to accomplish any or all of the aforesaid objects in a system wherein the apparatus is not adversely affected by variations in the temperature of ambient air, or other fluid.

Other objects of my invention, and the invention itself, will become more apparent to those skilled in the art to which my invention appertains, by reference to the following description of an embodiment of my invention, and in which description reference is had to the accompanying drawing, forming a part of this specification, illustrating the said embodiment.

Referring to the drawing:

Fig. 1 is a plan view of a controller for my improved system;

Fig. 2 is a side elevational view of the controller of Fig. 1;

Fig. 3 is an end elevational view with the electrical current controlling portion of the apparatus only, shown in transverse section on the line 3—3 of Fig. 1;

Fig. 4 is a sectional view shown on line 4—4 of Fig. 1, of the pivotal mounting for certain thermostatic strips employed in my improved controlling apparatus.

Fig. 5 is a diagrammatic view of a system including the apparatus illustrated in the foregoing figures, and a co-operative remotely disposed milammeter;

Fig. 6 is a view in side elevation, of a pivoted thermally compensated electrically heated control element representing another embodiment and adapted to be substituted for the corresponding element of the foregoing figures;

Fig. 7 is a view corresponding to that of Fig. 4 for the embodiment of Fig. 6.

Referring now first to the embodiment of my invention shown in Fig. 1 to 5 of the drawing, inclusive, in all of which like parts are designated with like characters, at 3 I show a base for a controlling apparatus mounted on the plate 1, secured to said base, which may be a wall of a room, oven, or the like, whereof it is desired that remote indications of temperature be effected. Mounted on the plate 1 is a sheet metal bracket 5 to a depending arm 5' of which, one end of an arcuate thermostatic strip 6 is rigidly secured.

Secured to the free end of the thermostatic strip 6 is a bar 7 on the end of which is mounted a carbon button contactor, or resistor, 8. The contactor 8 is engageable with a like contactor 9 mounted on the free end of a thermostatic strip 10 which has its other end rigidly secured to a block 12, which is formed of a material such as a phenolic condensate or the like which serves both as electrical and heat insulation, the block 12 being pivoted on pins 13 loosely projected through oppositely aligned apertures of the arms 5x and 5y of the bracket 5.

The thermostatic strips 6, 10 and a third thermostatic strip 14, are each of bi-metallic construction, such bi-metallic strips being made from superposed sheets of different metallic materials having different co-efficients of thermal expansion, integrally secured together by their contacting faces, as by welding, brazing, or otherwise securing the faces together. Strips being cut from such sheets have the property, when heated, of warping; when a normally straight strip is thus warped, the more expansive side takes a convex form, with the less expansive side of the strip taking a concave form.

When previously formed to a given concavo-convex form as in the case of the strip 6, wherein the more expansive material is placed on the outside at 6' and the less expansive material is placed on the inside as shown at 6", an increase of temperature will effect a warping movement of the strip and tend to cause it to take a more abruptly curved form than that shown and, therefore, to tend to move the contactor 8 more firmly against contactor 9.

Secured to the block 12 is the thermostatic strip 14, the free end of which is urged against a set screw 15 by a compression spring 16 centered upon and abutting upon a set screw 17 mounted in an arm of the U-shaped bracket 18, whereof the set screw 15 is mounted in the other arm. The bracket 18 is secured by its intermediate yoke portion to the plate 1, and the screws 17 and 18 extend laterally in opposite directions from their respective supporting bracket arms for ready access by a screw driver for adjustment of the contact 9 carried by the strip 10 relative to the cooperating contactor 8. The bracket 5 is supported on the plate 1 by a pair of screws 19 each projected through the bracket arm 5x and the interposed tubular spacing posts 20, and insulating plate 21 interposed between the plate 1 and the adjacent ends of the posts 20. The strip 10 is wrapped with a thin layer 22 of mica, or the like, or has a portion of its outer surface otherwise suitably insulated, whereon an electrical heating winding 23 of an efficient electrical resistor material such as nickel chromium alloy material is placed, one terminal of the winding being electrically connected as at 24 to the metallic strip 10, the other terminal being insulated therefrom and proceeding by a conductor 25 to the electrically connected binding posts 26. The other pair of electrically joined binding posts 27 are connected to the sheet metal support 5 by an electrical circuit conductor 28.

The contactors 8 and 9 being adjusted to engagement by manual adjustment of the set screw 15, an electrical circuit is completed between the binding posts 26 and 27 through the circuit conductor 25, the electrical heating resistor winding 23, the thermostatic strip 10, which is mounted on the insulating block 12, the engaging contactors 9 and 8, the metallic strip extension 7 and the supporting bi-metallic strip 6 therefor, the sheet metal support 5 and the circuit conductor 28.

Assuming that the apparatus of my invention is to be mounted in a wall of an oven, or room, to remotely indicate the temperature thereof, the plates 1 and 3 being made of such material as to resist whatever temperature may be encountered in the environment to be adopted, the electrical circuit completed between the binding posts 26 and 27 as above described is included in an electrical system such as is illustrated in Fig. 5 wherein a source of current such as a battery B and a mil-ammeter indicated at A are connected in serial circuit by circuit conductors 29 with the apparatus of Fig. 1, the circuit for which was above traced, and operates as follows, with the assumption that the electrical switch 30 shown in the circuit conductor 29 between the source of current and the mil-ammeter is as illustrated in such position as to close the circuit.

The amount of current flowing over the circuit will be determined by the amount of pressure with which the carbon contactors 8 and 9 engage with each other. This is a peculiar property of carbon contactors, namely, that, other things being equal, the amount of current flowing in a circuit including said contactors in serial circuit, varies commensurably with the pressure with which they are forced together.

Therefore, the mil-ammeter A will effect an indication by its hand 31 which is commensurable with the pressure of contact exerted between the carbon contacts 8 and 9.

As the temperature of the ambient air surrounding the controller of Fig. 1 is increased, as before stated herein, the pressure engagement between the contacts 8 and 9 will be likewise increased, causing an additional amount of current to flow through the heating resistor 23, which will heat the bi-metallic thermostatic strip 10 to cause it to warp its free end carrying the contactor 9 in such a direction as to reduce the pressure of contact between the contactors 8 and 9.

As the strip 10 is warped by the effect of the heating electrical current as described, the electrical current will be reduced due to the consequent decrease in pressure exerted between the contactors 9 and 8, to decrease the heating of the strip 10 and to reduce the warping of said strip. These varying actions mutually reacting accomplish a result which has as its ultimate effect for any certain amount of movement of the contactor 8 responsive to the temperature of ambient air, the causing of a certain amount of current to flow through the electrical resistor 23. The current through the resistor 23 also flows over the circuit including the circuit conductors 29, Fig. 5, flowing through the interposed mil-ammeter A to accomplish a given deflection of the mil-ammeter needle or hand 31, such as that shown and which deflection is preferably directly proportional to and in any event commensurable with the amount of current of the mil-ammeter; and by the operation of the contacts 8 and 9 under the control of the warpable strip 10, electrically heated by the resistor 23, the indication given by the ammeter hand 31 will be commensurable with the amount of movement of the contactor 8 accomplished by ambient air temperature effective on the strip 6.

It is important to note that in no case, under conditions of adjustment available in the apparatus, do the contactors 8 and 9 entirely separate, but effect a rheostatic function in regulating the flow of current over the circuit including the mil-ammeter which effects the function of an indicator of temperature of the ambient air surrounding the strip 6.

The reduction of pressure between the contacts 8 and 9 by the warping of the strip 10 in response to heat of the resistor 23 occurs independently of the warping of the strip directly in response to changes of the ambient temperature, due to the compensating action of the strip 14. Both strips 10 and 14 are secured at one end to the pivoted block 12 as above described and the ambient temperature acts upon both strips. Any increase of ambient temperature warps the strip 10 in the direction to tend to move the contact 9 away from the contact 8 or to reduce the pressure therebetween; but the same increase of ambient temperature warps the strip 14 in the direction to rotate the block 12 counter-clockwise as viewed in Fig. 1 which neutralizes the tendency of the strip 10 to move. Thus the strip 14 compensates the strip 10 for the effects of ambient temperature on the strip 10.

It is to be noted that the arm 7 rigidly secured on the end of the strip 6 is not thermally responsive, as is the supporting strip 6. Therefore any slight amount of heating of the arm 7 by the resistor 23 will have no effect thereon, and the strip 6 is too remotely disposed from the resistor 23 to be substantially affected by heat therefrom; also, the resistor 23 is very intimately associated with the strip 10 and substantially all of the heat from the resistor enters said strip.

The supporting block 12 is likewise an insulator of heat as well as of electricity and the pinions at the end of the block are preferably of the same material so that little or no heat is conveyed thereby either to the compensating strip 14 or to the frame 5, whereby otherwise, conceivably heat might be conveyed to the strip 6 to lessen the efficiency of the device. The compensating strip 14 is also spaced and disposed edgewise to the strip 10 to minimize the communication of heat between the strips to insure increased efficiency for the apparatus.

In the operation of the apparatus and system as above described, the flow of current through the winding of the electrically heated strip 10 and the electro-responsive electromagnetic indicator occurs without any interruptions of current and without substantial surges of current above and below the average value as in the case of prior constructions disclosed in my prior said co-pending application. There is no arcing at the contactors and the contactors being of carbon will last almost indefinitely.

Referring now to the embodiment of my invention shown in Figs. 6 and 7, I have therein illustrated a modified form of thermally compensated actuator for the contactor 9'. The compensating strip 14' thereof is adjustable and operates to compensate for purely ambient air temperatures in the same manner as in the preceding embodiment. The block 12' electrically and thermally insulates the strip 14' from the grid 10' which is of bi-metallic material and functions in the manner of the strip 10 when supplied with a heat resistor 23. The block 12 is pivoted in the frame 5 as in the preceding embodiment and for the same reasons. The grid 10 comprises a plurality of parallel strips of bi-metallic material adjacent strips of which are alternately interconnected so as to provide a single electrical conductor of bi-metallic material arranged in zig-zag form to produce a combination warpable element supplying when heated the function of the warpable strip 10 and in addition, when an electrical current is passed therethrough has its individual strips of such small cross-sectional area as to offer a considerable resistance to the flow of electrical current and becomes heated by the passage of such current.

When so heated, electrically, as a resistor, it will warp in effecting its function as a compound warpable strip or grid. The operation of this embodiment of my invention will be thenceforth understood by reference to the operation of the first embodiment described herein above, it being understood that the serially connected bi-metallic strips of small area are interposed in the electrical circuit between the contactor 9' and the frame 5 of the mechanism and that the grid 10' will be interposed in the circuit of Fig. 5 in the place of the resistor 23 and strip 10. The element 9' may broadly be considered as an operating head for the thermostat, by which actuation of such elements as the contactors 8—9' may be had.

Having thus described my invention in two embodiments, I am aware that numerous and extensive departures may be made in the embodiments herein illustrated and described but without departing from the spirit of my invention.

I claim:

1. A thermostat comprising a support, a head oscillatably mounted on the support, a pair of thermostatic bendable strips each rigidly secured by an end portion to the oscillatable head and having each a thermally laterally movable free end portion extending therefrom, means on the support to laterally adjustably move the free end of a compensating one of said strips relative to the support and prevent movement thereof from its adjusted position, the other strip having an operating head on a free end portion thereof and adapted to be electrically heated and bent by electric current to move the operating head relative to the adjustable end of the other strip, the compensating strip alone tending to rock the head and the other strip bodily therewith upon a change of temperature.

2. A thermostat comprising a support, a head oscillatably mounted on the support, a pair of thermostatic strips each rigidly secured by one end portion to said head and having each a laterally thermally movable free end portion extending therefrom, means on the support to adjustably laterally move the free end of a compensating one of said strips relative to the support and to prevent movement thereof from its adjusted position, the other strip comprising a zig-zag grid of bimetallic wire thermally warpable when heated, and an operating head supported by the free end of the grid, said grid being responsive to electrical current passed therethrough to be heated, and, by thermal warping action, to move the operating head relative to the adjustable end of the other strip, the compensating strip adapted to oscillate the head and the other strip bodily upon a change of ambient temperature.

3. A thermostatic device comprising a support, a head oscillatably mounted on the support, a pair of thermostatic bendable strips each connected to the oscillatable head to move therewith and having each a thermally movable free portion extending from the head, means to adjustably position the free portion of a compensating one of said strips to adjust the position of the head, the other strip having an operating head supported by the free portion thereof and adapted to be heated and bent by electric current to move the operating head relative to the support, the compensating strip tending to oscillate the oscillatory head and the other strip bodily therewith upon a change of ambient temperature.

4. A thermostatic device comprising a support, a head oscillatably mounted on the support, a pair of thermostatic bendable strips each connected to the oscillatable head to move therewith and having each a thermally movable free portion extending from the head, means to adjustably position the free portion of a compensating one of said strips to adjust the position of the head, the other strip comprising a zig-zag grid of bimetallic wire thermally bendable when heated and an operating head supported by the free portion of the grid, said grid being responsive to electric current passed therethrough to be heated and by thermal bending action to move the operating head relative to the support, the compensating strip tending to oscillate the oscillatable head and the other strip bodily therewith upon a change of ambient temperature.

THEODORE J. SMULSKI.